3,177,142
DRILLING FLUID
John S. Brukner and Clarence O. Walker, Houston, and Walter J. Weiss, Sugar Land, Tex., assignors to Texaco Inc., New York, N.Y., a corporation of Delaware
No Drawing. Filed June 21, 1962, Ser. No. 204,074
22 Claims. (Cl. 252—8.5)

This invention relates to the drilling of wells through subsurface formations while employing drilling fluids. More particularly, this invention relates to a drilling operation, such as a rotary drilling operation which involves the circulation of a dispersed drilling fluid through the well bore and about the drilling bit, an improved dispersed drilling fluid suitable for use in a drilling operation and an additive material for the preparation of said dispersed drilling fluid.

It has now been found that a specific group of compounds, namely, the water soluble inorganic stannates, arsenates, sulfites, bisulfites, and metaborates, as well as mixtures thereof, are particularly effective in improving the high temperature properties of drilling fluids conventionally referred to as shale control type drilling fluids. More particularly, this invention resides in the discovery that the compatible water soluble alkali metal, ammonium and alkaline earth metal salts of the stannates, arsenates, sulfites, bisulfites, metaborates and mixtures thereof are especially effective in providing superior high temperature gelation properties to dispersed shale control drilling fluids.

A particular shale control drilling fluid is described and claimed in commonly assigned U.S. 2,802,783. This drilling fluid, hereinafter referred to as "shale control drilling fluid," in this specification, is characterized by an aqueous phase which is saturated with respect to calcium hydroxide, contains dissolved therein a water soluble calcium salt having a water solubility greater than that of calcium hydroxide in an amount sufficient to provide a calcium ion concentration of at least about 200 p.p.m. and wherein the pH is not above 12.6, generally in the range between about 11 and 12.5.

There is also advantageously incorporated in these shale control drilling muds a suitable amount of a water loss agent, such as hydrolyzed starch or carboxymethylcellulose (CMC) in a minor amount usually in the range of about 0.2 to 5 lbs. per barrel of drilling fluid to improve the water loss properties thereof. Also, there can be desirably incorporated or emulsified therein a minor amount of oil so as to improve the lubricating properties and lubricity of the drilling fluid. When oil is incorporated in the mud there is also present in the drilling fluid a suitable oil emulsifying agent therefor.

In addition to the above materials there is also incorporated in the drilling mud a suitable clay dispersing agent to maintain the drilling clay particles and clayey material in suspension therein and to control the viscosity of the resulting drilling mud. Any suitable clay dispersing agent suitable for dispersing clayey particles or drilling clay material in the drilling mud may be employed. Suitable dispersing agents include the various lignosulfonates, such as the sodium and calcium lignosulfonates. Particularly suitable as a dispersing agent is a heavy-metal-containing lignosulfonate, such as a ferrochrome-containing lignosulfonate. A particularly useful ferrochrome-containing lignosulfonate is a material manufactured in accordance with U.S. 2,935,473 and U.S. 2,935,504, and sold under the trade name "Q-Broxin." This material, a ferrochrome-containing lignosulfonate, containing iron in an amount of about 3.5% (calculated as $Fe_2O_3$) and chromium in an amount of about 0.20% by weight has been found to be particularly satisfactory as a dispersing agent for clayey material in the shale control muds.

These dispersing agents are usually incorporated in a minor amount in the drilling muds, such as, for example, an amount in the range of from about 1 to 10 pounds per barrel. Such amounts are normally sufficient to effect the desired viscosity control and maintenance in the drilling mud.

A typical shale control drilling mud which is improved in accordance with the practice of this invention, this shale control drilling mud having been obtained by converting a field hole mud by the addition thereto of 7 lbs. per bbl. of a drilling mud additive containing calcium chloride, lime and calcium lignosulfonate, in the weight ratio range 1:5–6:5–6, respectively, exhibits the following approximate properties:

Mud weight _____ About 10 lbs. per gal.
Mud solids _____ Approximately 15% by vol.
pH _____ 12.05.
$P_f$ _____ 0.6.
$M_f$ _____ 1.3.
$P_m$ _____ 7.8 to about 11.
Viscosity, 600 r.p.m., Stormer _____ 40.4 cpe.

$P_f$ is defined as number of cc. of $N/50$ $H_2SO_4$ required to titrate 1 cc. of aqueous phase (filtrate) of drilling fluid to a phenolphthalein end point and is a measure of the soluble hydroxyl ion content from the lime.

$M_f$ is defined as number of cc. of $N/50$ $H_2SO_4$ required to titrate 1 cc. of aqueous phase (filtrate) of drilling fluid to methyl orange end point and is a measure of the soluble hydroxyl and carbonate ion content.

$P_m$ is defined as number of cc. of $N/50$ $H_2SO_4$ required to titrate 1 cc. of the whole mud to a phenolphthalein end point. It indicates the rapidly available hydroxide alkalinity from the whole mud.

In the preparation of a shale control drilling mud there is usually incorporated in the aqueous phase thereof, which is saturated with calcium hydroxide, a water soluble calcium salt in an amount sufficient to yield the desired calcium ion concentration therein of at least 200 p.p.m. of calcium from the water soluble calcium salt. Any suitable water soluble calcium salt may be employed. Calcium chloride is generally preferred as the water soluble calcium salt. Other suitable calcium salts which may be employed in the preparation of a shale control drilling mud include calcium nitrate, calcium sulfate, calcium acetate, calcium formate, calcium citrate and calcium gluconate. Other water soluble calcium salts are known and may be suitably employed.

It has been found, however, that when shale control muds are employed in a drilling operation wherein the drilling mud becomes exposed to a relatively high temperature, such as a temperature above about 250° F. during the drilling operation, the drilling mud deteriorates as evidenced by a material increase in the viscosity of the drilling mud coupled with the formation of an undesirable viscous gel.

It is an object of this invention to provide shale control mud having improved high temperature properties.

It is another object of this invention to provide a drilling reagent additive material suitable for the preparation and/or maintenance of a shale control drilling fluid characterized by a pH in the range of about 11 to 12.5, a relatively high dissolved calcium content and improved high temperature gelation properties.

It is another object of this invention to provide an improved drilling method.

How these and other objects are accomplished will become apparent in the light of the accompanying disclosure. In at least one embodiment of the practice of this invention at least one of the foregoing objects will be achieved.

In accordance with the present invention a dispersed shale control mud, that is, an aqueous drilling mud or drilling fluid containing clay and a clay dispersing agent and characterized by an aqueous phase saturated with calcium hydroxide, has a pH not above about 12.6, and contains a water soluble calcium salt with a solubility greater than calcium hydroxide dissolved therein to provide a dissolved calcium content or calcium ion concentration in the aqueous phase thereof of at least 200 p.p.m. by weight, is improved as to high temperaure properties by incorporating therein a minor amount, such as, for example, from about 0.1 to about 10 pounds per barrel of drilling fluid, of a water soluble inorganic salt selected from the group consisting of the alkali metal, ammonium and alkaline earth metal salts of the stannates, arsenates, sulfites, bisulfites, metaborates including mixtures thereof. This range 0.1 to 10 pounds per barrel is equivalent to about 0.024 to about 2.4% by weight based on a 10 pounds per gallon drilling fluid.

The practice of this invention is particularly effective for improving the high temperature properties of shale control muds having a relatively high solids content, i.e., a suspended and/or dispersed solids content, such as clay solids, above about 10% by weight particularly above about 15% by weight, based on the drilling fluid.

Suitable water soluble inorganic salts that can be satisfactorily employed in accordance with the practice of this invention to improve the high temperature properties of shale control drilling fluids include sodium stannate, sodium arsenate, sodium sulfite, sodium bisulfite, sodium metaborate, and the corresponding water soluble potassium, lithium, ammonium, calcium, barium and strontium derivatives of these anions. However, the water soluble salt must be compatible with the drilling mud, otherwise it is not satisfactory.

It is surprising that the above-mentioned water soluble inorganic stannate, arsenate, sulfite, bisulfite and metaborate salts hereinafter referred to as the "stannate-metaborate group," are capable of materially improving the high temperature properties of shale control drilling fluids when other water soluble inorganic salts are not effective in accomplishing this desirable result. For example, water soluble inorganic sodium salts, such as sodium arsenite, sodium periodate, sodium chlorate and sodium hyposulfite, hereinafter referred to as the "arsenite-hyposulfite group," are not effective in improving the high temperature properties of shale control drilling fluids. Shale control drilling fluids containing the arsenite-hyposulfite group of salts do not show any material improvement in high temperature properties, and in some cases these salts exhibit adverse effects on the fluid properties of the resulting drilling fluids. The unsatisfactory results obtained, using this latter above-mentioned group of inorganic salts, namely, the arsenite-hyposulfite group, illustrates further the unexpected specificity of the salts of the present invention in improving the high temperature properties of shale control drilling fluids.

A drilling fluid in accordance with this invention may be prepared in the first instance by the addition to water of a suitable drilling fluid reagent admixture prepared in accordance with the teachings of this invention, together with, if desired, a minor amount of an alkalinity agent, such as sodium hydroxide or calcium hydroxide or by the addition of the special drilling mud additive of this invention to water containing hydratable drilling clay material dispersed therein, together with the addition of the usual drilling mud additives (water loss additive, weighting material, oil emulsifying agent, and the like). Further, if desired, a conventional aqueous drilling fluid may be converted by the addition thereto of an alkalinity agent, such as caustic soda or calcium hydroxide, a water soluble calcium salt such as calcium chloride and a clay dispersing agent, together with a minor amount of a water soluble inorganic salt selected from the above-mentioned stannate-metaborate group of salts in accordance with the teachings of the present invention to yield an improved shale control drilling fluid.

In the preparation of an improved drilling fluid in accordance with this invention, a drilling mud additive material is conveniently employed. In accordance with one embodiment a drilling mud additive material suitable for use in the practice of this invention includes an admixture of a water soluble calcium salt, such as calcium chloride, calcium hydroxide, a dispersing agent for clayey material, such as calcium lignosulfonate, or a ferrochrome-containing lignosulfonate and one of the above-mentioned water soluble inorganic stannate-metaborate group of salts in the weight range ratio of 0.1–1.0:1.0–10.0:10.0:0.1–2, respectively. This admixture when employed in the preparation of an improved shale control mud in accordance with this invention is incorporated in the drilling fluid in an amount in the range from 2 to 20 pounds per barrel of drilling fluid.

The following tests are indicative of the practice of this invention and demostrate how the high temperature properties of a shale control drilling mud characterized by an aqueous phase having a pH in the range of about 11 to 12.6, being saturated with calcium hydroxide and containing a water soluble calcium salt dissolved therein to provide a dissolved calcium content of at least 200 parts per million by weight are improved by incorporating or otherwise adding or associating with the drilling fluid a water soluble salt selected from the stannate-metaborate group of inorganic salts. In the tests, conventional shale control muds were used as the base muds. Samples of the base muds were tested before incorporating therein salts of the stannate-metaborate group in amounts of 1.5 pounds of salt per barrel of mud in accordance with this invention to improve the high temperature properties thereof. The resulting treated and untreated drilling muds were then subjected to various tests. The results of these tests are set forth in the accompanying Table I.

*Table I*

| Sample No. | Salt | Properties before Heating | | | | Properties after Heating 8 Hrs. at 300° F. | | |
|---|---|---|---|---|---|---|---|---|
| | | Viscosity, cpe. | | pH | Ca++, p.p.m. | Reslurried Viscosity, cpe. | | Shear Value, Lbs./100 Ft.² |
| | | V600 | V100 | | | V600 | V100 | |
| 1 | Mud A | 47 | 77 | 11.89 | 240 | 133 | 522 | 700 |
| 2 | A+sodium sulfite | 37 | 56 | 12.0 | 200 | 115 | 476 | 375 |
| 3 | A+sodium stannate | 36 | 54 | 11.9 | 120 | 108 | | 300 |
| 4 | Mud B | 58 | 66 | 11.9 | 880 | 99 | 279 | *730 |
| 5 | B+sodium sulfite | 39 | 48 | 12.0 | 680 | 41 | 88 | *<8 |
| 6 | B+sodium bisulfite | 33 | 39 | 11.4 | 760 | 78 | 228 | *310 |
| 7 | B+sodium arsenate | 37 | 47 | 11.8 | 680 | 75 | | <200 |
| 8 | B+sodium metaborate | 38 | 44 | 11.9 | 900 | 50 | | <200 |

* After 8 hours at 250° F.

Mud A is a field shale control mud containing 28% by volume of total solids and has 10% by volume of oil emulsified therewith using a conventional oil emulsifying agent. The mud weight was 11.9 pounds per gallon.

Mud B is another field shale control mud prepared with an admixture of calcium chloride, lime, and calcium lignosulfonate in the weight range ratio of 1:5–6:5–6 respectively. The mud weight was 11.9 pounds per gallon.

The data in Table I above show that the addition of minor amounts of the water soluble salts of this invention, namely, the stannate-metaborate group, to a shale control drilling fluid, results in a marked improvement in the high temperature properties of the drilling fluid. In particular, the data show that the viscosities and shear values of the base muds were significantly lowered in each of the tests.

These data effectively illustrate the effectiveness of the water soluble inorganic stannate-metaborate group of salts in imparting superior high temperature properties to dispersed shale control mud drilling fluids.

Another series of tests were conducted using other inorganic salts to demonstrate the effectiveness of the water soluble inorganic salts of this invention, the stannate-metaborate group, in improving the high temperature properties of gyp mud drilling fluids. These other inorganic salts, the arsenite-hyposulfite group, were used in amounts of 1.5 pounds of the inorganic salt per barrel of mud. The resulting treated muds were then tested and the results obtained are shown in Table II below.

Mud C is a field shale control mud prepared from a mixture of calcium chloride, lime and calcium lignosulfonate dispersant and contains suspended clay solids.

shale control mud is saturated calcium hydroxide and has a pH between about 11 and 12.6.

Our copending patent application Serial No. 204,039, filed concurrently herewith, relates to the use of water soluble stannates, periodates, arsenites, chlorates and vanadates including mixtures thereof in gyp muds to improve the high temperature properties thereof.

This application is a continuation-in-part of our copending application Serial No. 785,801, filed January 9, 1959, now abandoned.

We claim:

1. An aqueous drilling fluid comprising an aqueous phase which is saturated with calcium hydroxide and having a pH not above 12.6, said aqueous phase containing a water soluble calcium salt dissolved therein to yield a calcium ion concentration of at least 200 parts per million by weight and a minor amount in the range of from about 0.1 to about 10 lbs. per barrel of said drilling fluid of a compatible water soluble inorganic salt selected from the group consisting of the alkali metal, ammonium and alkaline earth metal salts of the stannates, arsenates, sulfites, bisulfites, metaborates, and mixtures thereof.

2. An aqueous drilling fluid comprising hydratable clayey material dispersed in an aqueous phase that is saturated with calcium hydroxide, having a pH between 11 and 12.5, said aqueous phase having dispersed therein an amount of solids above 10% by volume based on said drilling fluid, containing a calcium salt dissolved therein to yield a calcium ion concentration of at least 200 parts per million by weight, a lignosulfonate dispersing agent for said clayey material and a minor amount in the range of about 0.1 to 10 pounds per barrel of said drilling fluid of a compatible water soluble inorganic salt selected from

*Table II*

| Sample No. | Salt | Properties before Heating | | | | Properties after Heating 8 Hrs. at 300° F. | | Shear Value, Lbs./100 Ft.$^2$ |
|---|---|---|---|---|---|---|---|---|
| | | Stormer Viscosity, cpe. | | pH | Ca$^{++}$, p.p.m. | Reslurried Viscosity, cpe. | | |
| | | V600 | V100 | | | V600 | V100 | |
| 1 | Mud B | 57 | 66 | 11.9 | 880 | 99 | 279 | *730 |
| 9 | B+sodium hyposulfite | 55 | 66 | 11.8 | 1,200 | 96 | 267 | *670 |
| 10 | Mud C | 49 | 85 | 11.88 | 240 | Fluid, too viscous. | | |
| 11 | C+sodium periodate | 71 | 176 | 11.5 | 200 | Fluid to plastic. | | |
| 12 | C+sodium arsenite | 98 | 309 | 11.67 | 160 | Plastic. | | |
| 13 | C+sodium chlorate | 53 | 90 | 11.78 | 400 | Fluid, too viscous. | | |

*After 8 hours at 250° F.

The test results set forth in Table II, above, show that the addition of the arsenite, hyposulfite, periodate, chlorate, and hyposulfite salts to the base muds had no stabilizing effects on the "after bombing" flow properties of the base mud.

The beneficial results obtained with the water soluble inorganic salts, in accordance with this invention, namely, the stannate-metaborate group of inorganic salts, and the adverse results obtained with the arsenite-hyposulfite group of salts, as recorded in Tables I and II above, respectively, demonstrate the unexpected advantages of the stannate-metaborate group of salts in shale control drilling fluids to control the high temperature properties thereof. It is apparent from these data that such unobvious results are attributable to the specificity of the stannate-metaborate group of inorganic salts in the shale control system.

The high degree of specificity of the salts of the present invention in the shale control mud system is demonstrated by the fact that of the foregoing salts, only one, namely, the stannate salt, is effective in improving the high temperature properties of the so-called "gyp" muds. The gyp muds differ from the shale control muds in the feature that gyp muds are unsaturated with calcium hydroxide and exhibit a pH between about 8 and 10.5, whereas the the group consisting of an alkali metal, ammonium and alkaline earth metal salts of the stannates, arsenates, sulfites, bisulfites, metaborates and mixtures thereof.

3. A drilling fluid in accordance with claim 2 wherein said water soluble salt is sodium stannate.

4. A drilling fluid in accordance with claim 2 wherein said water soluble salt is sodium arsenate.

5. A drilling fluid in accordance with claim 2 wherein said water soluble salt is sodium sulfite.

6. A drilling fluid in accordance with claim 2 wherein said water soluble salt is sodium bisulfite.

7. A drilling fluid in accordance with claim 2 wherein said water soluble compound is sodium metaborate.

8. A drilling fluid in accordance with claim 2 wherein said water soluble compound is a mixture of sodium stannate and sodium arsenate.

9. A drilling fluid in accordance with claim 2 wherein said lignosulfonate dispersing agent is a ferrochrome-containing lignosulfonate.

10. A drilling fluid in accordance with claim 2 wherein said lignosulfonate dispersing agent is calcium lignosulfonate.

11. A drilling fluid in accordance with claim 2 wherein the pH of said aqueous phase is in the range of about 11.2 to 12.5.

12. A drilling fluid in accordance with claim 2 wherein said pH is in the range 11.2 to 12.5, said calcium ion concentration is in the range of about 500 to 2000 p.p.m. and wherein said water soluble compound is sodium stannate.

13. In the drilling of a borehole through a subterranean formation wherein a drilling fluid is passed through the borehole in contact with said formation during the drilling operation, the improvement which comprises contacting said formation with an aqueous drilling fluid comprising an aqueous phase which is saturated with calcium hydroxide, has a pH not above about 12.6, contains clay dispersed therein by a lignosulfonate disperant, contains a water soluble calcium salt dissolved therein to yield a calcium ion concentration of at least 200 parts per million by weight, and a minor amount in the range of from about 0.1 to about 10 lbs. per barrel of said drilling fluid of a compatible water soluble salt selected from the group consisting of alkali metal, ammonium and alkaline earth metal salts of the inorganic stannates, arsenates, sulfites, bisulfites, metaborates and mixtures thereof.

14. In the drilling of a borehole through a subterranean formation wherein an aqueous drilling mud is passed through the borehole in contact with said formation during the drilling operation, the improvement which comprises contacting said formation with an aqueous drilling mud comprising a hydratable clayey material dispersed in an alkaline aqueous phase having a pH not greater than 12.6, a lignosulfonate dispersing agent for said clayey material, said aqueous phase being saturated with calcium hydroxide, containing a water soluble calcium salt dissolved therein to provide thereto a calcium ion concentration in excess of 200 p.p.m., and a minor amount in the range of from about 0.1 to 10 pounds per barrel of said drilling mud, of a compatible water soluble salt selected from the group consisting of an alkali metal, ammonium and alkaline earth metal salts of the stannates, arsenates, sulfites, bi-sulfites, metaborates and mixtures thereof.

15. A method in accordance with claim 14 wherein said dispersing agent is a ferrochrome-containing lignosulfonate.

16. A method in accordance with claim 14 wherein said dispersing agent is a calcium lignosulfonate.

17. A method in accordance with claim 14 wherein said dispersing agent is a ferrochrome-containing lignosulfonate, and wherein said calcium ion concentration in said aqueous phase is obtained by dissolving calcium chloride therein.

18. A method in accordance with claim 14 wherein said dispersing agent is a calcium lignosulfonate, wherein said calcium ion concentration in said aqueous phase is obtained by dissolving calcium chloride therein, and wherein said water soluble compound is sodium stannate.

19. A method in accordance with claim 14 wherein said water soluble compound is sodium arsenate.

20. A method in accordance with claim 14 wherein said water soluble compound is sodium sulfite.

21. A drilling mud additive suitable for the preparation of an aqueous drilling fluid having a pH in the range 11 to 12.5 and a calcium ion concentration in excess of 200 parts per million by weight, consisting essentially of an admixture of a water soluble calcium salt, calcium hydroxide, a dispersing agent for clayey material, and a compatible water soluble inorganic salt selected from the group consisting of an alkali metal, ammonium and alkaline earth metal salts of the stannates, arsenates, sulfites, bisulfites, metaborates and mixtures thereof, in the weight ratio range of 0.1–1.0:1.0–10.0:1.0–10.0:0.1–2, respectively.

22. An additive in accordance with claim 21, wherein said water soluble calcium salt is calcium chloride, wherein said dispersing agent is a calcium lignosulfonate, and wherein said water soluble compound is sodium stannate.

References Cited in the file of this patent

UNITED STATES PATENTS

| Number | Name | Date |
|---|---|---|
| 1,728,662 | Chwala | Sept. 17, 1929 |
| 2,160,949 | Williams | June 6, 1932 |
| 2,377,309 | Butler et al. | June 5, 1945 |
| 2,450,936 | Cardwell | Oct. 12, 1948 |
| 2,452,021 | Wayne | Oct. 19, 1948 |
| 2,602,777 | Wayne | July 8, 1952 |
| 2,802,783 | Weiss et al. | Aug. 13, 1957 |
| 2,868,726 | Brukner et al. | Jan. 13, 1959 |
| 2,935,504 | King et al. | May 3, 1960 |

OTHER REFERENCES

Hurdle: Gyp Muds Now Practical for Louisiana Coastal Drilling, article in The Oil and Gas Journal, October 28, 1957, pages 93–95.

UNITED STATES PATENT OFFICE
CERTIFICATE OF CORRECTION

Patent No. 3,177,142                                                  April 6, 1965

John S. Brukner et al.

It is hereby certified that error appears in the above numbered patent requiring correction and that the said Letters Patent should read as corrected below.

Column 4, line 34, before "10.0", second occurrence, insert -- 1.0- --; columns 3 and 4, Table I, under the column heading "Shear Value, Lbs./100 Ft.$^2$", line 5 thereof, for "*$<$8" read -- *$<$80 --.

Signed and sealed this 21st day of December 1965.

(SEAL)
Attest:

ERNEST W. SWIDER                                        EDWARD J. BRENNER
Attesting Officer                                           Commissioner of Patents